INVENTOR.
C. W. STROBEL
BY
*Young & Quigg*
ATTORNEYS

United States Patent Office 3,646,142
Patented Feb. 29, 1972

3,646,142
HYDROGENATION OF POLYMERS
Charles W. Strobel, Borger, Tex., assignor to
Phillips Petroleum Company
Filed Nov. 12, 1969, Ser. No. 875,671
Int. Cl. C07c *15/10*
U.S. Cl. 260—669 P          10 Claims

ABSTRACT OF THE DISCLOSURE

A method of hydrogenating butadiene/styrene copolymers to produce pour point depressants is disclosed which involves determining the ratio between the quantity of the trans olefinic unsaturation in the reaction mixture and the quantity of the phenyl group within the reaction mixture and recovering the product depressant when the ratio between the two quantities corresponds to the desired pour point effectiveness, the quantitative determinations being preferably determined by infrared analysis.

---

Figure 1:
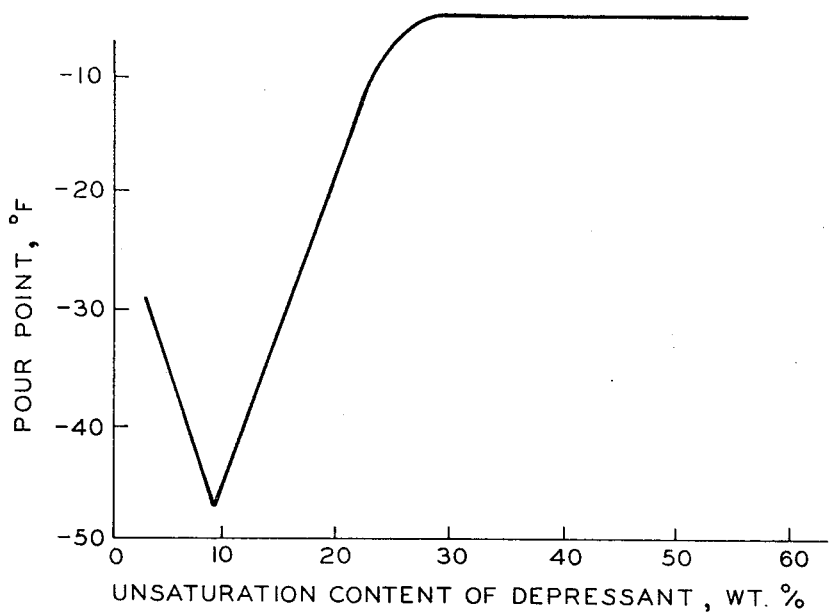

This invention relates to hydrogenated synthetic polymers.

In one of its more specific aspects, this invention relates to the production of hydrogenated synthetic polymers which are suitable as pour point depressants.

The hydrogenation of synthetic polymers is well known. In general, such processes involve dissolving the polymer in a suitable solvent and contacting this solution with hydrogen in the presence of a catalyst. A wide range of operating conditions are employable depending upon the polymer hydrogenated and the desired properties of the product.

One of the polymers frequently hydrogenated is a random butadiene/styrene copolymer. Hydrogenation produces a material of value as a pour point depressant for lubricating or fuel oils. However, due to the complexity of the copolymer feed, the flexibility of the reaction and the variable conditions under which the hydrogenation can be conducted, conducting this hydrogenation for maximum production of pour point depressants of maximum effectiveness has proved difficult. The process of this invention is directed to providing a method of monitoring a hydrogenation reaction to produce pour point depressants of maximum effectiveness.

According to the method of this invention there is provided a process of hydrogenating a polymer to produce a pour point depressant which comprises maintaining the reaction mixture containing the polymer under hydrogenation conditions and determining the ratio within the reaction mixture between the concentration of at least one chemical group whose concentration changes during the hydrogenation and the concentration of at least one chemical group whose concentration remains substantially unchanged during the hydrogenation, comparing the value of this ratio to a predetermined relationship between this ratio and the pour point depressing effectiveness of the reaction product, and recovering the reaction product from the reaction mixture when the ratio corresponds to the preselected pour point depressing effectiveness.

In one of its preferred embodiments, the chemical group whose changing concentration is determined is the trans olefinic unsaturated group from butadiene, and the chemical group whose substantially constant concentration is determined is the phenyl group from styrene.

In one of its more preferred embodiments, the determinations are made by infrared analyses.

In another of its preferred embodiments, the ratio of the trans olefinic unsaturation bond absorbence at 10.4 microns to the phenyl group absorbence at or about 11.2 microns is determined.

Accordingly, it is an object of this invention to provide a method of producing pour point depressants of optimum effectiveness by hydrogenation of synthetic polymers.

It is another object of this invention to provide a basis of predicting the pour point depressing properties of depressants produced by hydrogenation of butadiene/styrene copolymers.

The method of this invention can be carried out by determining the ratio between the concentration of any two groups within the reaction mixture, one of which groups changes in concentration as the hydrogenation proceeds and one of which groups remains substantially constant in concentration as the hydrogenation proceeds. In the subsequent examples, this ratio will be seen to be a decreasing function, although it need not necessarily be such.

The method of this invention is most advantageously carried out by determining the aforementioned concentrations by infrared absorption. The latter methods are well known and are based upon employment of one of the infrared absorption peak characteristics for the particular component whose concentration is concerned. While several such peaks may exist for any particular component it is preferable that the bands employed be of substantially the same intensity. If a band representative, for example, of combined styrene is desired, several may be employed although the most convenient is probably that at 9.7 microns. If, as a further example, a band representative of the trans olefinic unsaturated group is to be employed, that at 10.4 microns is employed.

While the method of this invention will be illustrated in relation to the hydrogenation of a butadiene/styrene copolymer having a 75/25 weight ratio, it is not intended to be so limited since the invention is also applicable to copolymers of butadiene and styrene of all ranges of weight ratios.

This invention is applicable to all methods of hydrogenating which do not eliminate from the reaction mixture those materials whose presence is essential to the infrared determinations involved or which do not incorporate in the product produced, for example, as by the inclusion of catalyst, extraneous material in amounts sufficient to interfere with the analytical procedures hereinafter defined.

Figure 2:
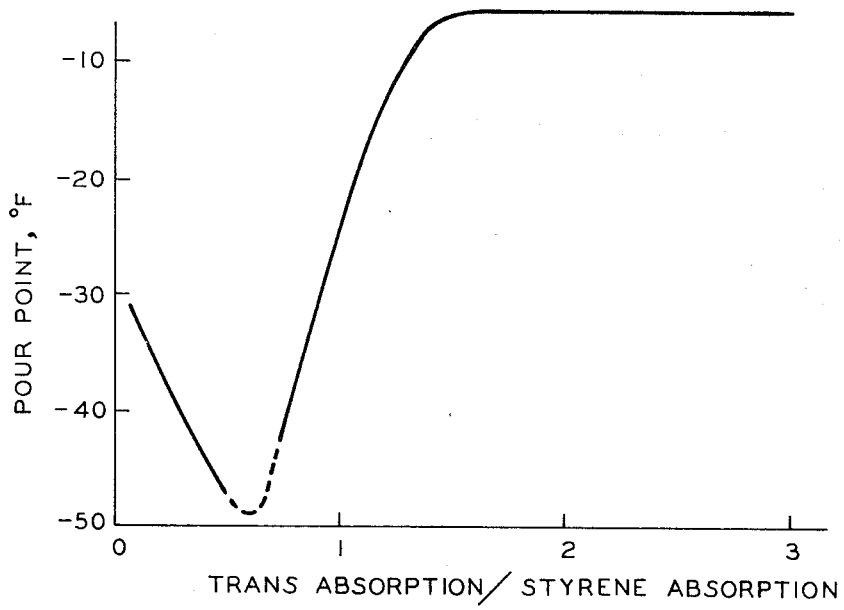

FIG. 1 is a graphic representation of the relation of the olefinic unsaturation content of the hydrogenated product to its pour point depressing effectiveness. FIG. 2 is a graphic representation of the pour point relationship of the hydrogenated product to the after-defined ratio of the trans olefinic absorption to styrene absorption of the product.

Illustrative of the method of this invention, 75/25 weight percent butadiene/styrene copolymers were individually hydrogenated in the presence of cyclohexane and a nickel catalyst employing the recipe and conditions shown below.

|  | Parts by weight |
|---|---|
| Polymer | 100 |
| Hydrogen, p.s.i.g. maximum | 200 |
| Nickel [a] | 0.15 |
| Triethylaluminum [b] | 0.62 |
| Temperature, °F. | 225–275 |
| Time, hours | 1–2 |

[a] Employed as a solution of nickel octoate, 6% by weight nickel.
[b] Employed as a solution in toluene, 23% by weight Et₃Al, diluted to 4.2% by weight Et₃Al with cyclohexane.

During the hydrogenation of each sample, two infrared measurements were employed, one for the trans olefinic unsaturation band at 10.4 microns and one for the combined styrene (phenyl) absorbence at 11.2 microns.

The technique employed was that conventionally used in the art and as outlined in the Encyclopedia of Polymer Science and Technology, vol. 7, "Infrared-Absorption Spectroscopy," page 620, Interscience Publishers, New York (1967).

In general, the method involved sampling the hydrogenation reaction mixture at various stages in the course of the reaction, preparing a polymer film of the sample and placing the polymer film on a potassium bromide plate. The solvent is evaporated leaving a dried film which is checked for solvent removal by absence of band at 11.6 microns in the spectrum.

The infrared spectrum of the film is then obtained in the 9-12 micron region with the attenuation of the reference beam being adjusted to give a maximum transmittance of 90-100 percent in this region. The strongest band in this region should have a transmittance of 10-40 percent.

The pour point of a 50 cetane index fuel oil containing the hydrogenated polymer is simultaneously determined for each sampling employing 0.04 weight percent of the polymer in the oil. Pour points are determined according to ASTM D 97-57.

Under the conditions, the following data were developed:

| Sample | Ratio of trans absorbence at 10.4 microns to styrene absorbence at 11.2 microns | Percent [a] unsaturation | Pour point, °F. |
|---|---|---|---|
| 1 | 0.24 | 7.2 | −40 |
| 2 | 0.71 | 13.7 | −35 |
| 3 | 0.13 | 4.9 | −35 |
| 4 | 0.97 | 12.1 | −35 |
| 5 | 1.04 | 11.3 | −40 |
| 6 | 0.82 | 10.3 | −45 |
| 7 | 0.95 | 7.5 | −40 |
| 8 | 0.37 | 6.1 | −45 |
| 9 | 1.0 | 12.6 | −35 |
| 10 | 0.74 | 11.1 | −40 |
| 11 | 0.84 | 6.5 | −45 |
| 12 | 0.78 | 15.2 | −35 |
| 13 | 0.11 | 4.3 | −35 |
| 14 | 0.50 | 8.1 | −40 |
| 15 | 0.41 | 6.4 | −40 |

[a] Determined by iodine chloride titration according to U.S. Pat. 3,299,016.

The data, relative to which "absorbence" is defined as the logarithm of the ratio of the reference beam intensity to the transmitted beam intensity, are graphically presented with other related data to construct those graphs shown in FIGS. 1 and 2.

FIGS. 1 and 2 indicate that as the hydrogenation of the polymer proceeds and as the absorbence of the trans olefinic unsaturation bond decreases in relation to the phenyl group absorbence, the pour point of the fuel oil containing the hydrogenated product decreases, passes through a minimum and then increases upon further hydrogenation.

Inasmuch as individual curves comparable to that of FIG. 1 can be constructed for each polymer and, for example, for each butadiene/styrene copolymer based upon its percentages of butadiene and styrene, it will be seen that such analyses can be effectively employed as a means of controlling the extent to which the hydrogenation reaction is allowed to proceed or as a means of predetermining the pour point depressing effectiveness of the finished product depending upon the extent to which the hydrogenation reaction is allowed to proceed.

In the practice of the method of this invention, the pertinent ratio is either periodically or continuously determined, the reaction being allowed to proceed to the attainment of the desired ratio at which time the reaction is terminated and desired pour point depressant is recovered. Infrared instruments capable of making the necessary determinations are readily available.

It will be seen that various modifications can be made to the method of this invention in light of the above disclosure. However, such modifications are considered as being within the scope of the invention.

What is claimed is:

1. A method of producing a pour point depressant by hydrogenation of a polymer, which comprises maintaining the hydrogenation reaction mixture containing the polymer at hydrogenation conditions, determining the ratio within said reaction mixture of the concentration of at least one chemical group whose concentration changes during the hydrogenation to the concentration of at least one chemical group whose concentration remains substantially unchanged during the hydrogenation in relation to a predetermined relationship between said ratio and the pour point of the reaction product recoverable from said reaction mixture and recovering said reaction product from the reaction mixture when said ratio corresponds to said pour point.

2. The method of claim 1 in which said concentrations are determined by infrared detection.

3. The method of claim 2 in which said ratio is represented by the ratio of the trans olefinic unsaturation bond absorbence at about 9.7 microns to the phenyl group absorbence at about 11.2 microns.

4. The method of claim 1 in which the ratio of the trans olefinic unsaturated bond absorbence at about 9.7 microns to the phenyl group absorbence at about 11.2 microns is determined in relationship to a predetermined relationship between said ratio and the pour point of said mixture, and said product is recovered from said reaction mixture when said ratio corresponds to said predetermined pour point.

5. The method of claim 4 in which said ratio is continuously determined.

6. The method of claim 4 in which said polymer is a butadiene/styrene copolymer.

7. The method of claim 6 in which said butadiene/styrene copolymer is a 75/25 weight percent butadiene/styrene copolymer.

8. The method of claim 4 in which said ratio is a decreasing function.

9. The method of claim 2 in which the infrared bands employed be of substantially the same intensity.

10. The method of claim 1 in which the chemical group whose changing concentration is determined is the trans-olefinic unsaturated group from butadiene and the chemical group whose substantially constant concentration is determined is the phenyl group from styrene.

References Cited

UNITED STATES PATENTS

| 3,433,845 | 3/1969 | Kovach et al. | 260—660 P |
| 3,370,010 | 2/1968 | Isaacson et al. | 260—667 |

FOREIGN PATENTS

| 621,955 | 6/1961 | Canada | 260—94.7 H |

CURTIS R. DAVIS, Primary Examiner

U.S. Cl. X.R.

23—230 HC, 208—DIG. 1; 260—667, 94.7 H, 96 HY